W. S. OSBORNE.
TRAP.
APPLICATION FILED NOV. 29, 1912.
1,069,461.
Patented Aug. 5, 1913.
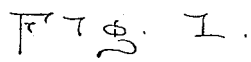
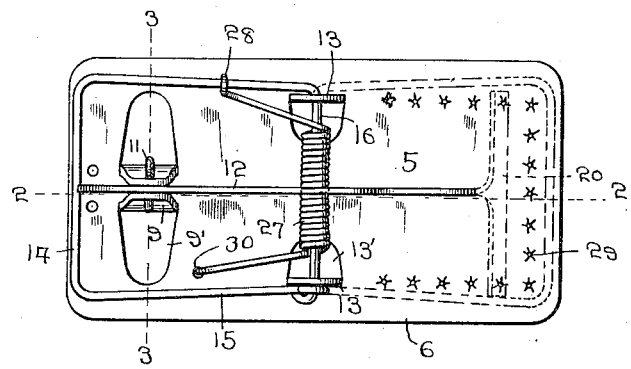
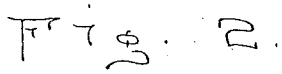
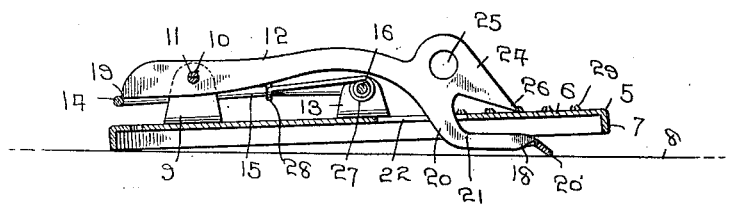
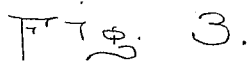
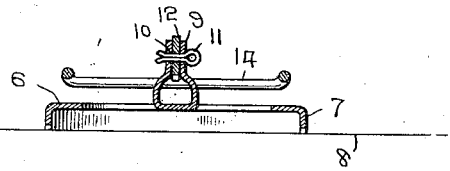
Witnesses
Thos. W. Riley
Sterling P. Buck.
Inventor
W. S. Osborne
By W. J. FitzGerald
Attorney

UNITED STATES PATENT OFFICE.

WINFIELD SCOTT OSBORNE, OF LA FAYETTE, INDIANA.

TRAP.

1,069,461.   Specification of Letters Patent.   Patented Aug. 5, 1913.

Application filed November 29, 1912. Serial No. 734,221.

*To all whom it may concern:*

Be it known that I, WINFIELD SCOTT OSBORNE, a citizen of the United States, residing at La Fayette, in the county of Tippecanoe and State of Indiana, have invented certain new and useful Improvements in Traps; and I do hereby declare the following to be a full, clear, and exact description of the invention, such as will enable others skilled in the art to which it appertains to make and use the same.

This invention relates to animal traps, and it more particularly relates to spring actuated traps.

An object of the invention is to provide an improved form of trap which is especially useful in catching mice, rats, etc.

Another object of the invention is to provide a trap of this character which may be manufactured with the fewest number of parts, consistent with thorough efficiency and thereby rendering the trap capable of being cheaply manufactured.

Another object of the invention is to produce a trap of this character which is compact, light, durable and of positive action.

Another object of the invention is to provide a trap of this character in which the weight of the animal operates or throws the trap.

Other objects and advantages may be recited hereinafter and in the claims.

In the acompanying drawings which supplement the following specifications, Figure 1 is a plan view of a form of my invention, Fig. 2 is a vertical sectional view on the line 2—2, Fig. 1, and Fig. 3 is a vertical sectional view on the line 3—3, Fig. 1.

In these drawings, in which similar reference characters correspond to similar parts throughout the several views, the body or base of my trap is designated by the numeral 5, and comprises a platform 6, provided with depending flanges 7 which are adapted to rest upon a floor or other surface and support the platform slightly above said surface, which latter is indicated by the numeral 8. This platform 6 is provided with a pair of upstanding brackets 9, apertured at 10, for the reception of a pivot or cotter key 11, which also extends through a trigger member 12, hereinbelow described. The brackets 9 are struck up from the plate 6 leaving the apertures 9'. On opposite sides of the platform 6, and approximately at the medial portion thereof, is formed a second pair of upstanding apertured lugs 13, which are struck up from the plate 6, leaving the apertures 13'. The lugs 13 constitute journal bearings for the striker or jaw member which comprises a rectangular frame consisting of a striker bar 14, side bars 15 and a pivot bar or axle 16, the latter extending through the bearings 13. The striker is formed from a rod or wire.

The striker is normally held out of operative position by means of the trigger 12 (previously mentioned). This trigger may be formed from any suitable material, but it is preferably stamped from sheet metal, and afterward formed as shown, by bending and twisting the stamped blank at 18, so that the surfaces on the opposite sides of these twisted portions are at right angles to each other. The trigger member essentially comprises the pivotal connections 11, the detent 19 and the actuating arm 20; but it will be understood that the pivotal connection is susceptible of various modifications within the scope and intent of my invention. As shown, the trigger member 12 extends rearwardly and downwardly from the pivot 11, and the lower rear corner of this rearward extension constitutes the detent 19. The trigger 12 extends forwardly from the pivot 11, and an arm 20 thereof extends down through a slot 22, and it extends thence substantially in a horizontal forward direction, and an elbow 21 unites the lower and upper sections of said arm 20, which terminates near the front flange 7 and approximately on the bottom plane of the flanges when the trap is closed or in operative position. Formed on the top edge of the trigger 12 is a bait receiver 24 having therethrough an aperture 25 into which meat, cheese, or other suitable bait may be secured. This bait receiver has a forward extension 26 which comprises means for limiting the downward movement of the arm 20, so that said arm may be held in the position shown in Fig. 2.

A helical spring 27 surrounds the axle of the striker member and has an end secured to the platform 6, by passing through the aperture 30, the other end of said spring being in engagement with one of the elements 15, as indicated at 28. When the trap is closed or in operative position, the striker or jaw member is in the position shown by dotted lines in Fig. 1, around the teeth 29, which are stamped out of the material of the base 5, and in proximity thereto, so that said teeth coöperate with the jaw member and spring 27, for holding an animal between the platform 6 and said jaw member. When in open or set position, the jaw member or striker is engaged by the detent 19, as shown in full lines, and when thus engaged, the spring 27 tends to force the striker bar 14 upward, thereby bearing upwardly on the detent 19 and thus forcing the arm 20 into its lowermost position, in which its extreme end or rest 20' is below the plane of the lower edge of the flange 7.

When the trap is set, as shown in Fig. 2, the rest 20' supports the front end of the platform 6 above the surface 8, said rest being supported by said surface. It is obvious that, when in this set position, if a sufficient weight is placed upon the front end of the platform, it will be forced down against the surface 8, thereby causing a relative movement of said platform and the arm 20, so that the detent 19 moves out of engagement with the striker, and the striker yields to the action of the spring 27 and swings through an arc of approximately 180 degrees, into the dotted line position shown in Fig. 1, moving with great rapidity and considerable impact, so as to wound or kill and clamp an animal whose weight has thrown the trap. While I have described the element 24 as a bait receiver, it will be understood that the invention is not dependent upon this form of bait receiver, since it is obvious that if bait were placed upon the platform 6, animals would be lured thereby, so that they would venture upon the platform 6, whereupon their weight would throw or actuate the trap.

It may be seen that I have provided a trap of this character which is fully capable of attaining the foregoing objects, and in a thoroughly practical and efficient manner.

I do not limit my invention to the exact details of construction, combination and arrangement of parts as herewith illustrated and described, but my invention may only be limited by a reasonable interpretation of the claims.

I claim:

A trap comprising a sheet metal base struck up to form a surrounding downwardly projecting supporting flange, a pair of centrally located vertical bearing lugs near the rear end, a pair of vertical bearing lugs at about the mid length of the base and near its sides respectively, and a slot in the longitudinal center extending forwardly from the line of said central lugs, a striker pivotally mounted in the central lugs, a spring for normally holding the striker down on the front end of the base and a trigger struck up from sheet metal, pivotally mounted in the rear central lugs extending forward over the pivotal bar of the striker, said trigger being provided at its rear end with a detent to engage the striker when the trap is set and being notched at its front end forming two arms, one of which arms projects downward through the central slot and provided with a cross bar at its lower end under the base, and the other arm extending forward beyond the central slot and arranged to contact with the top of the base when the trap is set.

In testimony whereof I have signed my name to this specification in the presence of two subscribing witnesses.

WINFIELD SCOTT OSBORNE.

Witnesses:
 D. H. FLYNN,
 JOE E. PAULEY.

Copies of this patent may be obtained for five cents each, by addressing the "Commissioner of Patents, Washington, D. C."